US006245422B1

(12) United States Patent
Onishi et al.

(10) Patent No.: US 6,245,422 B1
(45) Date of Patent: Jun. 12, 2001

(54) RECORDING MEDIUM HAVING GLOSS SURFACE LAYER

(75) Inventors: Hiroyuki Onishi; Masaaki Itano, both of Suwa; Kiyoshi Iwamoto; Senichi Yoshizawa, both of Shizuoka, all of (JP)

(73) Assignee: Seiko Epson Corporation & Tomoegawa Paper Co., Ltd., Tokyo-To (JP)

( * ) Notice: Subject to any disclaimer, the term of this patent is extended or adjusted under 35 U.S.C. 154(b) by 0 days.

(21) Appl. No.: 08/920,459

(22) Filed: Aug. 29, 1997

(30) Foreign Application Priority Data

Aug. 30, 1996 (JP) ........................................ 8-230552

(51) Int. Cl.$^7$ ........................................ B32B 5/16

(52) U.S. Cl. .......................... 428/331; 428/195; 428/409; 427/146

(58) Field of Search .................................... 428/195, 207, 428/211, 327, 328, 329, 331, 341, 342, 500, 212, 220, 688, 409; 427/146

(56) References Cited

U.S. PATENT DOCUMENTS 4,780,356 10/1988 Otouma .
5,576,088 * 11/1996 Ogawa et al. ........................ 428/327
5,662,997 * 9/1997 Onishi et al. ........................ 428/331

FOREIGN PATENT DOCUMENTS 0586846 3/1994 (EP) .
0655346 5/1995 (EP) .
0 705 710 4/1996 (EP) .
60-219084 * 11/1985 (JP) ................................ B41M/5/00
4-201286 7/1992 (JP) .

OTHER PUBLICATIONS

Product Brochure, SNOWTEX–UP (Brochure 1), Mar. 1995.*

Product Brochure, SNOWTEX–UP (Brochure 3), Sep. 1988.*

* cited by examiner

*Primary Examiner*—Bruce H. Hess
*Assistant Examiner*—Michael E. Grendzynski
(74) *Attorney, Agent, or Firm*—Ladas & Parry

(57) ABSTRACT

A recording medium which can prevent a failure of the recording medium to be fed or carried in a printer without sacrificing the glossiness is disclosed. Addition of a mixture of a spherical silica with a nonspherical silica to a gloss surface layer of a recording medium realizes good glossiness with good feedability and carriability in a printer.

14 Claims, 1 Drawing Sheet

RECORDING MEDIUM HAVING GLOSS SURFACE LAYER

BACKGROUND OF THE INVENTION

1. Field of the Invention

The present invention relates to a recording medium having a gloss surface layer.

2. Background Art

A gloss surface layer for smoothening the surface is sometimes provided on a recording media for use in recording with an ink composition to impart a high-quality feel or a photograph-like quality to the recorded image. An ink jet printer, especially a color ink jet printer, has made it possible to easily provide an image with high resolution, leading to a demand for a recording medium having a gloss surface layer suitable for use in ink jet recording.

Since the surface of the gloss surface layer is smooth, there is a fear of causing a failure of the recording medium with the gloss surface layer to be fed or carried in a printer. For example, when the recording medium is placed so as for the gloss surface layer to face a sheet feed roller of the printer, the sheet feed roller does not successfully engage with the smooth gloss surface layer and idled making it impossible to satisfactorily carry the recording medium. On the other hand, when the recording medium is placed so as for the gloss surface layer to face the sheet feed tray side of the printer, the gloss surface layer is adsorbed to the stacked sheets of the recording medium, causing a failure of the recording medium to be fed.

The conventional gloss surface layer has been produced by applying a mixture of silica with a binder onto the surface of a substrate by, for example, a casting method. For example, Japanese Patent Laid-Open No. 274587/1990 discloses a gloss surface layer comprising a pigment and a water-soluble binder. The pigment is composed mainly of synthetic silica and colloidal silica. Japanese Patent Laid-Open No. 117335/1995 discloses a gloss surface layer composed mainly of colloidal particles having an average particle diameter of not more than 300 nm. The claimed advantage is that use of silica can provide a gloss surface layer having good gloss.

So far as the present inventors know, however, no gloss surface layer using silica having considered geometry has been proposed in the art.

SUMMARY OF THE INVENTION

The present inventors have now found that incorporation of a mixture of spherical silica with nonspherical silica to the gloss surface layer can prevent a failure of a recording medium to be fed or carried in a printer without sacrificing the glossiness. The present invention has been made based on such finding.

Accordingly, an object of the present invention is to provide a recording medium having a gloss surface layer with good glossiness and possessing good feedability and carriability in a printer.

According to one aspect of the present invention, there is provided a recording medium comprising: a substrate; and a gloss surface layer on the substrate, the gloss surface layer comprising a spherical silica and a nonspherical silica.

DETAILED DESCRIPTION OF THE INVENTION

Recording Medium

The recording medium of the present invention is used for recording methods using an ink composition. Recording methods using an ink composition include, for example, ink jet recording, recording using writing implements, such as pens, and other various printing methods. Further, the ink composition is not limited to a liquid ink and embraces a wide variety of ink compositions such as solid colorants and colorants which, in use, are melted. In particular, the recording medium of the present invention is preferably used for ink jet recording.

The recording medium of the present invention has a gloss surface layer on the surface thereof. The gloss surface layer basically comprises spherical silica, nonspherical silica, and a binder component.

Use of spherical silica in combination with nonspherical silica to constitute the gloss surface layer in the recording medium can realize good gloss of the gloss surface layer and, at the same time, can effectively prevent a failure of the recording medium to be fed or carried in a printer. The recording medium of the present invention can realize a surface glossiness (60° specular glossiness) of not less than 35, preferably not less than 40. Further, according to a preferred embodiment of the present invention, the coefficient of static friction between gloss surfaces as measured according to the procedure set forth in JIS (Japanese Industrial Standard) P 8147 is in the range of from 0.8 to 1.1.

Figure 1:
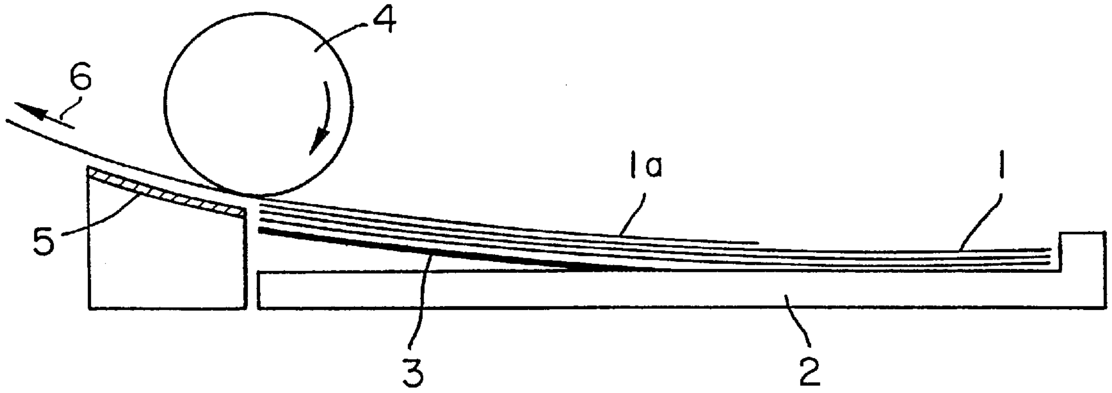
FIG. 1 is an explanatory view of one embodiment of feeding of a recording medium from a sheet feed tray in a printer.

According to the recording medium of the present invention, a failure of the recording medium to be fed does not occur both when the gloss surface layer surface faces the tray side and when the gloss surface layer surface faces the sheet feed roller side, for example, in a sheet feed tray and a sheet feeding method in a printer as shown in FIG. 1. In the drawing, sheets of a recording medium 1 are put on top of another and placed in a tray 2 as a recording medium receiving body. The recording medium 1 in the tray 2 is lifted by means of a leaf 3 provided in the tray 2. A sheet feed roller 4 as a pressing member is brought into press contact with the lifted recording medium 1*a* and, with the rotation of the sheet feed roller 4, the uppermost sheet 1*a* of the recording medium is drawn out of the tray. With the rotation of the sheet feed roller 4, the recording medium 1*a* is fed in the direction 6 of a recording device while sliding on a separation pad (made of, for example, urethane resin, foamed urethane, ether urethane rubber, a combination of a cork with rubber, or an elastomer) 5. When the gloss surface layer surface is on the tray 2 side, the gloss surface of the recording medium 1*a* is adsorbed to the backside of the underlying sheet of the recording medium 1, leading to a fear of a failure of the sheet to be fed. Further, in the last sheet of the recording medium placed in the tray 2, the gloss surface is likely to be adsorbed to the tray 2, leading to a failure of the sheet to be fed. With the recording medium of the present invention, such adsorption can be effectively prevented. On the other hand, when the gloss surface layer surface is on the sheet feed roller 4 side, the sheet feed roller 4 is likely to be idled, leading to a failure of the sheet to be fed. The recording medium of the present invention, however, can satisfactorily engage with the sheet feed roller 4 and carried without idling of the sheet feed roller 4. Further, the recording medium of the present invention can advantageously satisfactorily engage with various transfer rollers and the like within a printer and successfully carried.

According to the present invention, the term "spherical" means the shape of a substantially spherical particle, and, in the present invention, a cube or a polyhedron may be regarded as substantially spherical shape. Preferably, it means spheres. On the other hand, the term "nonspherical" preferably means an elongated particle shape having a length/thickness of not less than 5. According to a preferred embodiment of the present invention, the nonspherical silica is in such a form that substantially spherical silica particles are linked together to form a chain. In this context, the length means the length of the chain. A chain colloidal silica referred to a colloidal silica having such a structure that spherical silica particles are linked together to form a long chain. This long chain may be branched between both ends. In this context, the length refers to the length of the longest portion. The long chain refers to a chain of at least three spherical silica particles, preferably at least five spherical silica particles, more preferably at least seven spherical silica particles. The silica particles may be linked by interposing a divalent or higher metallic ion between primary particles of the spherical silica. Preferred metallic ions include divalent or higher metallic ions, and example thereof include $Ca^{2-}$, $Zn^{2-}$, $Mg^{2-}$, $Ba^{2+}$, $Al^{3+}$, and $Ti^{4-}$ with $Ca^{2-}$ being particularly preferred. Composite or mixed particles composed of colloidal silica and other inorganic particles, for example, alumina, ceria, or titania, may also be used. The nonspherical silica may be such that these are interposed to link the silica particles.

In the present invention, the spherical silica and the nonspherical silica may be provided as colloidal silica. However, the initial form is not particularly limited so far as the effect of the present invention can be attained.

The colloidal silica is usually an anionic colloidal dispersion prepared by stably dispersing ultrafine particles of silicic acid anhydride (silica) and may be prepared, for example, by the following method. An aqueous sodium silicate solution is passed into a cation exchange resin to prepare a sol having an $SiO_2/Na_2O$ ratio of 60 to 130. The sol is then heated and fired at a temperature of 60° C. or above to grow into discrete dispersed particles, and a sol passed through an ion exchange resin is added thereto to cause polymerization deposition. Thus, colloidal silica can be prepared as a sol which has been grown into particles having an average particle diameter of 3 to 200 nm and stabilized.

In the present invention, commercially available colloidal silica may be used, and examples thereof include Ludox manufactured by Du Pont, Syton manufactured by Monsanto, Nalcoag manufactured by Nalco, and Snowtex manufactured by Nissan Chemical Industry Ltd.

In the present invention, the size of the spherical silica in terms of diameter is preferably about 20 to 100 nm, more preferably about 40 to 60 nm. On the other hand, for the nonspherical silica, the thickness is preferably about 5 to 40 nm, more preferably about 10 to 20 nm.

The amount of the spherical silica and the nonspherical silica in the gloss surface layer is about 70 to 95% by weight, more preferably about 85 to 95% by weight.

The mixing ratio of the spherical silica to the nonspherical silica in the gloss surface layer is preferably about 2:8 to 9.5:0.5, more preferably about 5:5 to 8:2.

The thickness of the gloss surface layer may be suitably determined by taking various requirements into consideration. In the production process described below, however, the coverage of the gloss surface layer is preferably about 7 to 35 $g/m^2$, more preferably about 9 to 20 $g/m^2$.

In the present invention, the binder for forming a gloss surface layer may be suitably selected by taking the production process and the like into consideration, and examples thereof include water-soluble resins and aqueous emulsion resins, such as acrylic resin, polyester resin, polyurethane resin, styrene/butadiene copolymer resin, acrylonitrile/butadiene copolymer resin, polyvinyl alcohol resin, water-soluble polyvinyl acetal resin, polyvinyl butyral resin, and other vinyl resins, amide resin, oxidized starch, casein, polyethylene oxide, polyvinyl pyrrolidone, silicone resin, rosin-modified maleic acid resin, rosin-modified phenolic resin, alkyd resin, and coumarone-indene resin.

According to a preferred embodiment of the present invention, the gloss surface layer may further comprise various additives from the viewpoint of improving the properties of the recording medium. Specific examples of such preferred additives include antioxidants, ultraviolet absorbers, fluorescent brighteners, waterproofing agents, antifading agents, and antistatic agents.

The recording medium of the present invention is formed using a substrate as a base. The substrate for the recording medium according to the present invention is not particularly limited so far as it can support the gloss surface layer or an ink-receptive layer described below and has satisfactory strength as a recording medium. The substrate may be either transparent or opaque. Opaque substrates usable herein include clothes, woods, metallic sheets, and papers. Beside them, opacified transparent substrates described below may also be utilized.

In the present invention, use of paper as the substrate is preferred. Preferably, the paper comprises a pulp material composed mainly of a natural cellulose fiber. Although the composition and the production process may be suitably determined, for example, paper produced by wet papermaking is preferred. In particular, wood pulps prepared from conifer or broad-leaved tree alone or from a suitable mixture of conifer or broad-leaved tree, such as kraft pulp, sulfite pulp, and semichemical pulp, may be used as the pulp material, and bleached pulp is preferred from the viewpoint of providing sharp prints. It is also possible to use waste paper pulp and non-wood pulps such as bagasse, kenaf, cotton, hemp, esparto paper, bamboo, and straw.

In papermaking, sizing agents, wet strength agents, fillers, and surface strength agents may be suitably incorporated as internally added chemicals. Further, internally added strength agents, such as starch, modified starch, carboxymethylcellulose, polyacrylamide, and styrene resin, colorants, fixing agents such as and aluminum sulfate and polyacrylamide, and, besides surface strength agents described below as coating chemicals, waterproofing agents, such as dialdehyde starch, melamine resin, and polyamide resin, antistatic agents, water repellents, antifriction agents, surface sizing agents, pigments and the like may be optionally used as chemicals internally added to the pulp material.

For use in ink jet recording, the air permeability of the recording medium is regulated to preferably about 60 to 120 sec/100 cc. For this end, the air permeability of the paper substrate is preferably not more than 80 sec/100 cc, particularly preferably 30 to 60 sec/100 cc. In order to provide such air permeability, a stuff with the beating degree of the pulp material being 30 to 50° SR is provided, and internally added chemicals, such as a sizing agent, a wet strength agent, and a filler, are suitably added thereto followed by papermaking. The air permeability can be controlled also by size press coating of a surface strength agent in the course of papermaking or by coating of a surface strength agent after the papermaking.

The Stockigt sizing degree of the paper substrate is preferably 10 to 100 sec. A Stockigt sizing degree in the above range can offer a recording medium which is less likely to create feathering or bleeding, possesses good ink receptivity, and is good in adhesion of an ink-receptive layer to the paper substrate. In the present invention, the sizing agent applied to the paper substrate is not particularly limited, and examples thereof include rosin (solution or emulsion form), alkylketene dimers, alkenylsuccinic acids anhydride, waxes, styrenic resins, olefinic resins, styrene-acrylic resins, end styrene-maleic acid resins. The amount of the sizing agent added is preferably about 0.1 to 1.0 part by weight based on 100 parts by weight of the pulp.

The wet strength agent, which may be applied to the paper substrate, serves to improve the Stockigt sizing degree and, at the same time, to impart waterproofness. Preferred examples of wet strength agents usable herein include melamine resin, polyamide epichlorohydrin resin, and urea resin. The amount of the wet strength agent added is preferably about 0.01 to 1.0 parts by weight based on 100 parts by weight of the pulp.

The filler, which may be applied to the paper substrate, serves to control the smoothness, thereby facilitating the formation of the ink-receptive layer, and, at the same time, to improve the opacity, thereby contributing to the hiding effect. Preferred examples of fillers usable herein include kaolin, clay, talc, titanium dioxide, and calcium carbonate. The amount of the filler added is generally not more than 10 parts by weight, preferably 0 to 5 parts by weight, based on 100 parts by weight of the pulp.

The surface strength agent, which may be applied to the paper substrate, serves to improve the air permeability and Stockigt sizing degree of the paper substrate. Preferred examples of surface strength agents usable herein include oxidized starch, esterified starch, polyacrylamide, acrylic resin, polyvinyl alcohol, SBR, NBR, and vinyl oxide resin. They may be coated by size press of a paper machine or an off-machine coater. The coverage is preferably about 0.5 to 2.5 g/m$^2$.

When a transparent substrate is selected as the substrate for the recording medium, examples of transparent substrates usable herein include films or sheets of polyester resin, diacetate resin, triacetate resin, acrylic resin, polycarbonate resin, polyvinyl chloride resin, polyimide, cellophane, and celluloid, and glass sheets and the like. According to a preferred embodiment of the present invention, when the substrate is transparent, use of a polyester film is preferred. Particularly preferred is a biaxially stretched polyethylene terephthalate film, one or both surfaces of which have been subjected to corona discharge treatment, because an even coating can be formed thereon and, in addition, good adhesion between the ink-receptive layer and the substrate can be offered. Further, a whitened polyethylene film prepared by incorporating a white inorganic pigment into the polyethylene film or incorporating fine air bubbles into the interior of the film can also be used.

The thickness of the substrate is suitably determined and, in general, is preferably about 50 to 250 $\mu$m, more preferably about 75 to 200 $\mu$m.

According to a preferred embodiment of the present invention, the recording medium may have an ink-receptive layer between the substrate and the gloss surface layer. The ink-receptive layer may be composed mainly of a pigment and a binder. Pigments usable herein include pigments, such as silica, clay, mica, mica capable of being swollen, talc, kaolin, diatomaceous earth, calcium carbonate, barium sulfate, aluminum silicate, synthetic zeolite, alumina, zinc oxide, lithopone, and satin white, and organic or inorganic coloring pigments. Examples of binders usable herein include water-soluble resins and aqueous emulsion resins, such as acrylic resin, polyester resin, polyurethane resin, styrene/butadiene copolymer resin, acrylonitrile/butadiene copolymer resin, polyvinyl alcohol resin, water-soluble polyvinyl acetal resin, polyvinyl butyral resin, other vinyl resins, amide resin, oxidized starch, casein, polyethylene oxide, polyvinyl pyrrolidone, silicone resin, rosin-modified maleic acid, rosin-modified phenolic acid, alkyd resin, and coumarone-indene resin.

The composition of the ink-receptive layer may be suitably determined by taking the ink absorption, dryness of ink, sharpness of recorded image and the like into consideration. According to a preferred embodiment of the present invention, use of a combination of a water-soluble resin, such as a polyvinyl alcohol resin, a water-soluble polyvinyl acetal resin, or polyvinyl pyrrolidone, as the binder with silica as the pigment is preferred. In this case, the resin to silica ratio is preferably 1:1 to 1:15, particularly preferably 1:2 to 1:10. According to a further preferred embodiment of the present invention, the average particle diameter of silica is preferably about 1 to 30 $\mu$m (volume average particle diameter as measured by the Coulter counter method), particularly preferably 5 to 25 $\mu$m.

Other ingredients for improving the properties of the recording medium may be added to the ink-receptive layer of the recording medium according to the present invention. For example, waterproofing agents, such as melamine-formaldehyde resin, urea-formaldehyde resin, acrylamide resin, glyoxal, and ammonium zirconium carbonate, may be added from the viewpoint of improving the water resistance of the ink-receptive layer and preventing feathering or bleeding of the ink. Further, dispersants, fluorescent dyes, pH adjustors, antifoaming agents, wetting agents, preservatives and the like may be added from the viewpoint of further enhancing the productivity, recording properties or storage stability of ink jet recording sheets.

Preferred examples of the ink-receptive layer include an ink-receptive layer, described in Japanese Patent Laid-Open No. 222281/1985, using a fluorine-containing synthetic silica as a void-forming material. In the ink-receptive layer described in this publication, bringing the fluorine content of the synthetic amorphous silica to a specific content enables feathering or bleeding to be effectively controlled.

Another preferred example of the ink-receptive layer is described in Japanese Patent Laid-Open No. 95285/1987. In the ink-receptive layer described in this publication, amorphous silica is used as a part of the pigment, and the ink-receptive layer is formed by cast coating. This ink-receptive layer has high smoothness and can offer a print with the periphery of the dot being sharp.

Still another preferred example of the ink-receptive layer is described in Japanese Patent Laid-Open No. 186372/1989. This ink-receptive layer comprises a polyacrylamide having a molecular weight of 10000 to 500000, a synthetic amorphous silica, and polyvinyl alcohol and is excellent in storage stability of the recorded image.

Examples of other ink-receptive layers are described in Japanese Patent Laid-Open Nos. 276670/1990, 139275/1990, and 297831/1994. The ink-receptive layer described in these publications is constituted by provision of a porous layer of a particular alumina hydrate, and the claimed advantage of the ink-receptive layer is realization of a print having high ink dot roundness, excellent dye fixation, and high color density.

Preparation of Recording Medium

The recording medium of the present invention is preferably prepared as follows.

A coating liquid comprising a mixture of spherical silica with nonspherical silica and a binder is provided. Regarding the spherical silica and the nonspherical silica, those in the form of the colloidal silica is preferably used to prepare the coating liquid.

The coating liquid may be prepared by adding a binder to a mixture of spherical silica with nonspherical silica, optionally adding optional additive ingredients, and conducting mixing.

A substrate for a recording medium or a substrate provided with an ink-receptive layer described below is then provided. The coating liquid is then applied onto the surface of the substrate or, when an ink-receptive layer is provided on the substrate, onto the surface of an ink-receptive layer to form a gloss surface layer. The gloss surface layer may be formed by any suitably selected method. According to a preferred embodiment of the present invention, the formation of the gloss surface layer by the film casting method described below is preferred. For example, the method described in Japanese Patent Laid-Open No. 151476/1988 is preferred. According to this method, a recording medium having excellent ink absorption can be produced.

In the film casting method, the coating liquid may be coated by any method without particular limitation so far as the coating liquid can be evenly coated on the surface of the substrate or the surface of the ink-receptive layer. Examples of coating methods usable herein include air-knife coating, rod bar coating, gravure coating, and reverse roll coating.

In the film casting method, a film having a smooth surface, preferably a resin film, is put on top of the coating liquid layer. The film should be laminated when the coating liquid layer is still in an undried state. Therefore, if possible, the film is laminated immediately after the coating. Preferably, the lamination is performed by passing through between two rolls such as nip rolls. Laminating conditions, for example, pressure and temperature, may be suitably determined so far as good gloss of the gloss surface layer and, in addition, various good properties of the recording medium can be realized. However, the nip roll pressure is preferably about 3 to 5 kg/cm$^2$. Preferred examples of films usable for lamination on the coating liquid layer include resin films having a high smoothness (e.g. Bekk smoothness of the film is not less than 5000 sec), such as polyester, polypropylene, polyethylene, and polyimide, and resin films prepared by providing a releasable silicone coating on the resin film. According to a preferred embodiment of the present invention, it is preferred to use a coating liquid and a film having such a relationship that the contact angle of the coating liquid to the film is not more than 90°.

After the lamination, the coating liquid layer is dried. Thereafter, the film is removed to give a recording medium. The coating liquid layer is dried by vaporizing the solvent from the paper substrate side. Regulation of drying conditions, such as temperature, is considered important for realizing good air permeability of the recording medium and smoothness of the surface of the gloss surface layer. According to a preferred embodiment of the present invention, the drying is performed by exposure to air having a temperature of about 110 to 150° C. at a nozzle air velocity of not less than 15 m/min for 30 to 60 sec. Conditions for separating of the resin film, for example, angle or speed, may be suitably determined so that, for the surface of the gloss surface layer, good glossiness, Bekk smoothness, and desired coefficient of friction are realized.

When an ink-receptive layer is provided, the ink-receptive layer may be formed by dissolving or dispersing materials, for forming the ink-receptive layer, in water or a suitable solvent to prepare a coating liquid and coating the coating liquid on the substrate by, for example, roll coating, blade coating, air knife coating, rod bar coating, gravure coating, Komma coating, or die coating.

The coverage of the ink-receptive layer after drying is preferably 5 to 30 g/m$^2$, particularly preferably 10 to 20 g/m$^2$.

JIS P 8147: Method for Determining Coefficient of Friction of Paper

The coefficient of static friction between gloss surfaces of the recording media of the present invention are measured according to the following method set forth in JIS P 8147 as Horizontal Method.

Figure 2:
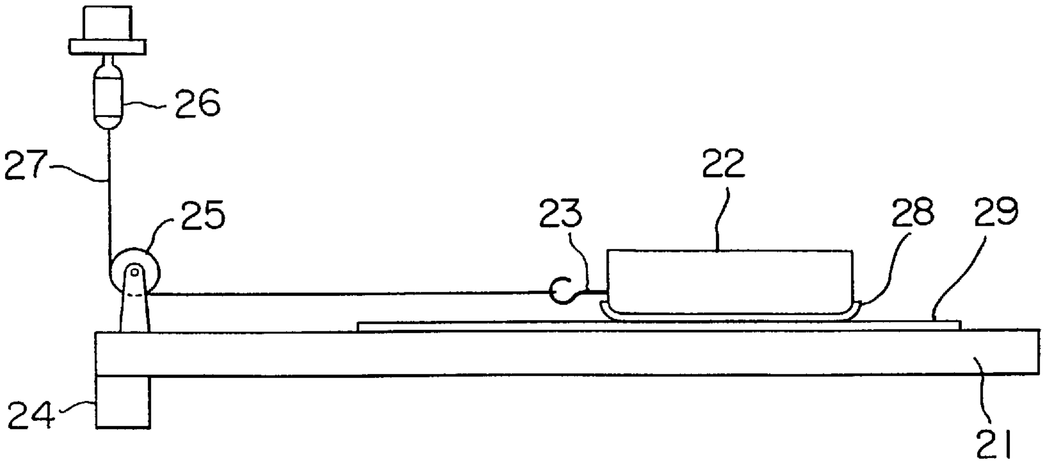
FIG. 2 shows a test machine of coefficient of friction according to JIS P 8147.

The testing machine used in the test method is shown in FIG. 2. The machine consists of a tensile tester with constant rate of extension (not shown), a horizontal plate 21 and weight 22. The load cell with maximum load 49.0 N (5 kgf) is used in tensile tester with constant rate of extension. The horizontal plate 22 is a plate of metal, glass or wood with plane surface about 200 mm in width and about 450 mm in length. One end of the plate 22 is fixed to lower movable beam 24 of the tensile tester by screws so that the plate 22 may be horizontal. On the horizontal plate 22, a pulley 25 with light weight and low friction is equipped. The outer side of the pulley 25 is positioned just under the load cell of the tensile tester and the under side is in height same as that of hook 23 of the weight 22. The weight 22 is a metallic block with plane surface and is connected with the load cell portion 26 of the tensile tester by means of wire 27 which is a fine metal wire such as stainless steel wire or synthetic fibre is such as polyester fibre though the pulley 25. The pressure to be applied to the bottom of the weight 22 is 1.64±0.24 kPa (16.7±2.5 gf/cm$^2$). While, for example, the weight having 60 mm in width, 100 mm in length and 1000 g in mass is used, the size and mass are not required to be exact.

Two test pieces of paper 28 and 29 are provided between the horizontal plate 21 and the weight 22. Flaws, wrinkles and the like shall not exist in the test pieces. It is required to take precaution so that the test results may not be affected by touching the measured portion to stain with hand fat or by marking with pencil or the like. As for the test pieces for the horizontal plate 21, the width is wider by about 40 mm than the width of those for the weight 22 and the length meets the horizontal plate taking the fixing portion into consideration (for example, about 100 mm in width and 250 mm in length). As for the test pieces for the weight 22, the width is the same as that of the weight 22 and the length is in the degree capable of being attached to the weight 22 (for example, 60 mm in width and 120 mm in length).

The test is conducted as follows. The two ends of the test piece 29 are fixed to the horizonal plate 21 with a adhesive tape so as not to generate wrinkles and sag. On the other hand, the two ends of the test piece 28 are fixed to the weight 22 so as not to generate wrinkles and sag. In the tensile tester, the moving speed of the lower movable beam 24 is set at 10.0±0.2 mm/min. The full scale of recording part in the tensile tester is set at 9.8 N (1 kgf). The weight 22 is moved by 50 mm and the frictional force during this is recorded. The first peak occurred at the moment when the weight 22 begins to move is taken as the force of static friction. While the weight continues to move, the friction force is taken as the force of dynamic friction. The procedure is conducted five times or more for the each combination of the test pieces.

The coefficient of static friction ($\mu s$) is calculated according to the following equation:

$$\mu s = F\mu s/Fn$$

where $F\mu s$ is force of static friction (mN), and

Fn is perpendicular load caused by the weight 22 (mN). The mean value of at least five test results shall be reported.

EXAMPLES

The present invention will be described in more detail with reference to the following examples, though it is not limited to these examples only.

Preparation of Paper Substrate

A pulp material composed of 50% by weight of NBKP and 50% by weight of LBKP was adjusted by means of a beater to a beating degree of 45° SR. Then, internally added chemicals having the following formulation were added to the pulp, thereby preparing a raw material. Paper was made from this raw material by means of a Fourdrinier machine. A coating liquid containing the following coating chemicals was coated by size press at a coverage of 1.0 g/m$^2$. The resultant coating was dried to prepare a paper substrate.

| | |
|---|---|
| Internally added chemicals | |
| Clay (special grade clay, manufactured by Kanatani Kogyo) | 2.25% by weight |
| Talc (SWB, manufactured by Nippon Talc Co., Ltd.) | 2.25% by weight |
| Melamine resin (Sumirez Resin 607SY, manufactured by Sumitomo Chemical Co., Ltd.) | 0.23% by weight |
| Rosin size (Sizepine E, manufactured by Arakawa Chemical Industries , Ltd.) | 0.5% by weight |
| Aluminum sulfate (manufactured by Nippon Light Metal Co., Ltd.) | 2.7% by weight |
| Coating chemicals | |
| Oxidized starch (SK-20, manufactured by Japan Corn Starch Co., Ltd.) | 20 parts by weight |
| Polyacrylamide (Polymerset 305, manufactured by Arakawa Chemical Industries, Ltd.) | 40 parts by weight |
| Common salt | 0.5 part by weight |
| Water | 500 parts by weight |

Preparation of Recording Medium

A coating liquid, for an ink-receptive layer, having the following composition was coated on one side of the paper substrate. The coating was then dried to form an ink-receptive layer at a coverage on a dry basis of 15 g/m$^2$.

| Coating liquid for ink-receptive layer | |
|---|---|
| Silica (tradename "Carplex BS304F" manufactured by Shionogi & Co., Ltd., average particle diameter 5.3 $\mu$m) | 150 parts by weight |
| Polyvinyl alcohol (tradename "Gohsenal T-330" manufactured by Nippon Synthetic Chemical Industry Co., Ltd., 10% aqueous solution) | 75 parts by weight |

-continued

| Coating liquid for ink-receptive layer | |
|---|---|
| Melamine crosslinking agent (tradename ¢Sumirez Resin SR613" manufactured by Sumitomo Chemical Co., Ltd., solid content 80%) | 3.2 parts by weight |
| Water | 650 parts by weight |

Thereafter, a coating liquid, for a gloss surface layer, comprising spherical silica (tradename "Snowtex XL" manufactured by Nissan Chemical Industry Ltd., solid content 20%) and nonspherical silica (tradename "Snowtex UP" manufactured by Nissan Chemical Industry Ltd., solid content 20%) in respective amounts (parts by weight) indicated in the following Table 1, and 50 parts by weight of polyvinyl alcohol (tradename "Gohsenal T-330" manufactured by Nippon Synthetic Chemical Industry Co., Ltd., 10% solution) was coated on the ink-receptive layer by means of a microgravure coater. Immediately after the coating, a 25 $\mu$m-thick polyester film was put on the coating liquid layer (solid content: about 18.3%). The laminate was passed through between nip rolls (pressure 4 kg/cm$^2$). The laminate was then passed through a floating dryer (temperature 120° C.), thereby drying the laminate. The polyester film was then removed to give a recording medium having a gloss surface layer at a coverage on a dry basis of 12 g/m$^2$.

A recording medium of Comparative Example 1 and a recording medium of Comparative Example 2 were prepared in the same manner as described above, except that either spherical colloidal silica alone or nonspherical colloidal silica alone was used in an amount of 250 parts by weight.

TABLE 1

| | Example | | | | | |
|---|---|---|---|---|---|---|
| | 1 | 2 | 3 | 4 | 5 | 6 |
| Spherical silica | 237.5 | 200 | 175 | 125 | 75 | 50 |
| Non-spherical silica | 12.5 | 50 | 75 | 125 | 175 | 200 |
| Ratio* | 9.5:0.5 | 8:2 | 7:3 | 5:5 | 3:7 | 2:8 |

*Ratio of spherical silica to non-spherical silica

Feedability of Recording Medium

As ink jet recording printers, MJ700V2C (manufactured by Seiko Epson Corp., recording medium being fed with the gloss surface facing the feed tray side) and MJ800C (manufactured by Seiko Epson Corp., recording medium being fed with the gloss surface facing the feed roller side) were used. Recording media prepared in Examples 1 to 6 and Comparative Examples 1 and 2 were placed in the feed tray of the printer, and 1000 sheets of the recording medium were fed in an environment of temperature 23° C. and humidity 55% to check for a failure of the recording medium to be fed. The percentage failure of sheet feed (%) was determined by the following equation:

Failure of sheet feed (%)=(number of times of failure of sheet feed/1000)×100.

The results are as summarized in Table 2. In the table, the evaluation with MJ700V2C and the evaluation with MJ800C were indicated respectively as (I) and (II), and the feedability was evaluated as A when the percentage failure of sheet feed is less than 1%; B when the percentage failure of sheet feed is 1 to 5%; and NG when the percentage failure of sheet feed exceeds 5%.

Glossiness of Recording Medium

The glossiness of the surface the recording media prepared in Examples 1 to 6 and Comparative Examples 1 and 2 were measured in terms of 60° specular glossiness according to the procedure set forth in JIS Z8741. The results were as summarized in the following Table 2.

Reflection Density of Record

The reflection density of a black blotted (100 duty) image area in prints obtained using the recording media prepared in Examples 1 to 6 and Comparative Examples 1 and 2 was measured with a Macbeth reflection densitometer (RD-917).

The results were as summarized in the following Table 2.

Coefficient of Static Friction of Recording Medium

For the recording media prepared in Examples 1 to 6 and Comparative Examples 1 and 2, two sheets of the recording medium were put on top of the other so as for the gloss surfaces to face each other. The coefficient of friction between the gloss surfaces was measured in terms of coefficient of static friction using a tester for measurement of coefficient of friction (horizontal direction.) specified in JIS P8147 in an environment of 20° C. and 65%. The test piece had a width of 30 mm and a length of 150 mm, and the moving speed was 100 mm/min The results were as summarized in Table 2.

TABLE 2

| | Example | | | | | | Comparative Example | |
|---|---|---|---|---|---|---|---|---|
| | 1 | 2 | 3 | 4 | 5 | 6 | 1 | 2 |
| Evaluation of sheet feedability | | | | | | | | |
| (I) | A | A | A | A | A | B | A | NG |
| (II) | B | A | A | A | A | B | NG | NG |
| Glossiness | 35 | 36 | 38 | 40 | 42 | 43 | 34 | 45 |
| Reflection density | 2.0 | 2.0 | 2.1 | 2.1 | 2.2 | 2.2 | 1.9 | 2.2 |
| Coefficient of static friction | 0.80 | 0.85 | 0.90 | 1.0 | 1.05 | 1.1 | 0.78 | 1.2 |
| Ratio | 9.5:0.5 | 8:2 | 7:3 | 5:5 | 3:7 | 2:8 | 10:0 | 0:10 |

What is claimed is:

1. A recording medium comprising: a substrate; and a gloss surface layer on the substrate, the gloss surface layer comprising a spherical silica, a nonspherical silica and a binder, wherein the spherical silica and the non-spherical silica are together present in the gloss surface layer in an amount of about 85 to 95 wt %, and wherein the ratio of the spherical silica to the non-spherical silica is 2:8 to 9.5:0.5.

2. The recording medium according to claim 1, wherein the spherical silica or nonspherical silica is made from colloidal silica.

3. The recording medium according to claim 1, wherein the nonspherical colloidal silica has a long chain structure comprising silica spheres linked with one another.

4. The recording medium according to claim 1, wherein an ink-receptive layer is provided between the substrate and the gloss surface layer.

5. The recording medium according to claim 1, wherein the gloss surface layer has a 60° specular glossness of not less than 35.

6. The recording medium according to claim 1, wherein the coefficient of statical friction according to JIS P8147 between gloss surfaces of the recording media is 0.8 to 1.1.

7. The recording medium according to claim 1, wherein the ratio of the spherical silica to the non-spherical silica is 3:7 to 8:2.

8. A process for producing the recording medium according to claim 1, comprising the steps of:

preparing a coating liquid comprising a spherical silica, a nonspherical silica, and a binder;

coating the coating liquid onto a substrate or onto an ink-receptive layer on a substrate to form a coating liquid layer;

putting and bringing a film having a smooth surface into intimate contact with the coating liquid layer;

drying the coating liquid layer to form a gloss surface layer; and removing the film from the gloss surface layer.

9. The method according to claim 8, wherein the film having a smooth surface is a resin film.

10. The method according to claim 8, wherein the coating liquid and the film used have such a relationship that the contact angle of the coating liquid to the film is not more than 90°.

11. A recording method comprising printing an ink composition onto the recording medium according to claim 1.

12. An ink jet recording method comprising the steps of: ejecting droplets of an ink composition; and depositing the droplets onto the recording medium according to claim 1 to conduct printing.

13. A record produced by the recording method according to claim 10.

14. A plurality of recording media, comprising at least a first recording medium and a second recording medium each of which comprises a substrate and a gloss surface layer on the substrate, the gloss surface layer of each of the recording media comprising a spherical silica and a nonspherical silica, said spherical silica and nonspherical silica being together present in each of the recording media in an amount of about 85 to 95 wt % and wherein the ratio of the spherical silica to the non-spherical silica is 2:8 to 9.5:0.5.

* * * * *